(12) United States Patent
Biegel et al.

(10) Patent No.: US 12,168,331 B2
(45) Date of Patent: Dec. 17, 2024

(54) METHOD FOR MANUFACTURING A WIND TURBINE BLADE AND MANDREL TOOL

(71) Applicant: Siemens Gamesa Renewable Energy A/S, Brande (DK)

(72) Inventors: Allan Biegel, Saeby (DK); Gabriele Chiesura, Aalborg (DK); Allan Hurup, Nibe (DK); Karsten Krarup, Randers SV (DK); Simon Vestphael Russek, Klarup (DK); Steffen Steffensen, Aalborg (DK)

( * ) Notice: Subject to any disclaimer, the term of this patent is extended or adjusted under 35 U.S.C. 154(b) by 0 days.

(21) Appl. No.: 18/008,990

(22) PCT Filed: Jun. 8, 2021

(86) PCT No.: PCT/EP2021/065232
§ 371 (c)(1),
(2) Date: Dec. 8, 2022

(87) PCT Pub. No.: WO2021/254817
PCT Pub. Date: Dec. 23, 2021

(65) Prior Publication Data
US 2023/0219316 A1 Jul. 13, 2023

(30) Foreign Application Priority Data
Jun. 15, 2020 (EP) ..................................... 20180028

(51) Int. Cl.
*B29D 99/00* (2010.01)
*B29C 33/48* (2006.01)
(Continued)

(52) U.S. Cl.
CPC ........ *B29D 99/0028* (2013.01); *B29C 33/485* (2013.01); *B29C 70/06* (2013.01);
(Continued)

(58) Field of Classification Search
CPC .......................... B29D 99/0028; B29C 33/485
See application file for complete search history.

(56) References Cited

U.S. PATENT DOCUMENTS 3,988,103 A 10/1976 Hoffmeister
4,754,543 A * 7/1988 Spivy .................. B26D 7/2621
279/2.24
(Continued)

FOREIGN PATENT DOCUMENTS

EP 3747639 A1 12/2020
JP 2013212833 A 10/2013
(Continued)

OTHER PUBLICATIONS

International Search Report for PCT/EP2021/065232, mailed on Sep. 10, 2021.

*Primary Examiner* — Courtney D Heinle
*Assistant Examiner* — Danielle M. Christensen
(74) *Attorney, Agent, or Firm* — Schmeiser, Olsen & Watts LLP

(57) ABSTRACT

A method for manufacturing a wind turbine blade is provided, including the steps of: a) arranging a fiber lay-up on a mandrel tool, the mandrel tool including a frame and, as seen in cross-section, at least two mandrel portions connected to the frame, and wherein at least a portion of the fiber lay-up is supported by an outer surface of the at least two mandrel portions, b) reducing a cross-section size of the mandrel tool by retracting at least one of the mandrel portions towards the frame, c) arranging the mandrel tool inside adjacent blade sections, d) increasing the cross-section size of the mandrel tool by extending at least one of the mandrel portions away from the frame, and e) infusing at least a portion of the fiber lay-up with a resin and curing the resin to obtain a cured joining portion joining the blade sections inside.

10 Claims, 11 Drawing Sheets

(51) Int. Cl.
- *B29C 70/06* (2006.01)
- *B29C 70/32* (2006.01)
- *F03D 1/06* (2006.01)
- *B29L 31/08* (2006.01)

(52) U.S. Cl.
CPC ............ *B29C 70/32* (2013.01); *F03D 1/0675* (2013.01); *B29L 2031/085* (2013.01); *F05B 2240/302* (2013.01)

(56) References Cited

U.S. PATENT DOCUMENTS

| | | | |
|---|---|---|---|
| 6,071,460 A | 6/2000 | Renaudin et al. | |
| 8,919,754 B2* | 12/2014 | Schibsbye | B29D 99/0028 |
| | | | 156/229 |
| 9,346,221 B2* | 5/2016 | Brennan | B29C 70/30 |
| 9,669,589 B2* | 6/2017 | Zamora Rodriguez | |
| | | | B29C 70/443 |
| 2010/0155984 A1 | 6/2010 | Hollensteiner et al. | |
| 2013/0298365 A1 | 11/2013 | Sibona et al. | |
| 2015/0266250 A1 | 9/2015 | Hoffman et al. | |
| 2019/0299543 A1 | 10/2019 | Dearman et al. | |

FOREIGN PATENT DOCUMENTS

| | | |
|---|---|---|
| TW | 201429674 A | 8/2014 |
| WO | 2016198075 A1 | 12/2016 |
| WO | 2018091735 A1 | 5/2018 |

* cited by examiner

METHOD FOR MANUFACTURING A WIND TURBINE BLADE AND MANDREL TOOL

CROSS-REFERENCE TO RELATED APPLICATIONS

This application claims priority to PCT Application No. PCT/EP2021/065232, having a filing date of Jun. 8, 2021, which claims priority to EP application Ser. No. 20/180, 028.1, having a filing date of Jun. 15, 2020, the entire contents both of which are hereby incorporated by reference.

FIELD OF TECHNOLOGY

The following relates to a method for manufacturing a wind turbine blade and a mandrel tool used in the method.

BACKGROUND

Producing more power using a wind turbine under given wind conditions can be achieved by increasing the size of the blades. However, the manufacture of wind turbine blades is becoming increasingly difficult for increasing blade sizes.

It is known to pre-manufacture lengthwise blade sections (such as an inboard blade section and an outboard blade section) separately from fiber-reinforced material and glue the sections to each other. However, the gluing process has some limitations. It is, for example, an open process where the glue is applied on the surfaces to bond and, as such, it may represent a hazard for the operators. In addition, it is difficult to control the quality of the glue line.

For example, WO 2016 198 075 A1 discloses a modular wind turbine blade comprising first and second lengthwise blade sections. The first and second lengthwise blade sections are connected to each other by bonding a connecting member by an adhesive to the blade outside.

SUMMARY

An aspect relates to an improved method for manufacturing a wind turbine blade and an improved mandrel tool for joining two blade sections of a wind turbine blade.

Accordingly, a method for manufacturing a wind turbine blade is proposed. The method comprises the steps of:
a) arranging a fiber lay-up on a mandrel tool, the mandrel tool comprising a frame and, as seen in cross-section, at least two mandrel portions connected to the frame, and wherein at least a portion of the fiber lay-up is supported by an outer surface of the at least two mandrel portions,
b) reducing a cross-section size of the mandrel tool by retracting at least one of the mandrel portions towards the frame,
c) arranging the mandrel tool inside adjacent blade sections,
d) increasing the cross-section size of the mandrel tool by extending at least one of the mandrel portions away from the frame, and
e) infusing at least a portion of the fiber lay-up with a resin and curing the resin to obtain a cured joining portion joining the blade sections inside.

Thus, a light-weight and at the same time strong blade section joint is provided. In particular, the strength of this laminate joint formed by resin infusion is comparable to the strength of the pristine laminate. Compared to a connection using an adhesive, the laminate joint formed by resin infusion provides a lighter and stronger blade section joint, in particular, a better weight-to-strength performance. This is because in the case of an adhesive, the weight of the adhesive is added in the bond line and the interlaminar shear strength drops as the bond line thickness increases. Further, the laminate joint formed by resin infusion avoids the problem of glue joints of having a different material in the glue than in the rest of the blade.

Furthermore, the proposed method for manufacturing a wind turbine blade allows to perform the joining process of the blade sections from inside the blade cavity. This facilitates the manufacturing process as there are joining processes, such as a web connection, which can only be performed from inside the blade cavity.

Furthermore, reducing the cross-section size of the mandrel tool allows to arrange it better and more easily inside the adjacent blade sections. In particular, it allows to better fit the mandrel tool inside cavities of respective blade sections. In particular, the mandrel tool can be arranged in the cavity of the respective blade section such that there is sufficient space between an outer surface of the mandrel tool and in inner surface of the respective blade section. For example, there is sufficient space provided to better manoeuvre and position the mandrel tool inside the cavity of the respective blade section. Further, there is, for example, sufficient space provided such that the respective blade section (e.g., its opening edge and/or its inner surface) does not interfere with the fiber lay-up arranged on the mandrel tool during the insertion process.

Further, the blade cross-section is increasing towards the blade root. Hence, when the mandrel tool is in its extended state its cross-section is also increasing towards an inboard end of the mandrel tool in order to position the fiber lay-up arranged on the mandrel tool at an inner surface of the blade sections. When arranging the mandrel tool (partly) into an inboard blade section and (partly) into an adjacent outboard blade section, it might be of advantage to insert it through the outboard end of the inboard blade section (and not through the inboard end/root portion of the inboard blade section). This is in particular the case for very long inboard sections. Reducing the cross-section size of the mandrel tool allows to better insert the mandrel tool through the outboard end of the inboard blade section despite the fact that the outboard end of the inboard section has a smaller cross-section as the inboard end of the mandrel tool in its original extended state.

The wind turbine blade is part of a rotor of a wind turbine. The wind turbine is an apparatus to convert the wind's kinetic energy into electrical energy. The wind turbine comprises, for example, the rotor having one or more of the blades connected each to a hub, a nacelle including a generator, and a tower holding, at its top end, the nacelle. The tower of the wind turbine may be connected via a transition piece to a foundation of the wind turbine, such as a monopile in the seabed.

The wind turbine blade comprises two or more blade sections dividing the blade in a lengthwise direction. In particular, the adjacent blade sections are arranged adjacent to each other in a lengthwise direction of the blade. A first one of the adjacent blade sections is, for example, an inboard blade section. The inboard blade section comprises, for example, a root section connected to the hub of the rotor. A second one of the adjacent blade sections is, for example, an outboard blade section. The outboard blade section comprises, for example, a blade tip. In addition to the described first and second blade sections, the wind turbine blade may also comprise one or more further blade sections. The one or more further blade sections may be joined with each other and/or with the described first and/or second blade sections by the same joining process by which the first blade section is joined with the second blade section.

The wind turbine blade, e.g., the root section, is, for example, fixedly connected to the hub. The wind turbine blade is, for example, directly bolted to the hub.

Alternatively, the wind turbine blade, e.g., the root section, is rotatably connected to the hub. For example, the wind turbine blade is connected to a pitch bearing of the wind turbine, and the pitch bearing is connected to the hub. The pitch bearing is configured to adjust the angle of attack of the blade according to the wind speed to control the rotational speed of the blade.

Apart from the (cylindrical) root section connected with the hub, the wind turbine blade has an aerodynamically shaped cross-section (airfoil). The wind turbine blade, i.e., each of its blade sections, comprises, for example, a pressure side (upwind side) and a suction side (downwind side). The pressure side and the suction side are connected with each other at a leading edge and a trailing edge. The pressure and suction sides and the leading and trailing edges define an interior cavity of the wind turbine blade.

Two adjacent blade sections might be arranged adjacent to each other such that the blade sections abut each other. Alternatively, there might be a small gap between the adjacent blade sections which may be filled by the (cured) joining portion.

The mandrel tool is, for example, arranged inside the adjacent blade sections by a lifting tool. The lifting tool is, for example, a crane or a lifting vehicle, and it allows to better arrange and position the mandrel tool.

When arranging the mandrel tool comprising the fiber lay-up inside the adjacent blade sections and then increasing the cross-section size of the mandrel tool the fiber lay-up is, in particular, arranged at an inner surface of the adjacent blade sections. For example, it is arranged at the inner surface of the adjacent blade sections such that it is overlapping with the blade sections in a joining area of the blade sections.

For example, an outer surface of the mandrel tool may reproduce (i.e., match with) the inner surface of the adjacent blade sections over the joining area of the blade sections.

The fiber lay-up includes, for example, glass fibers, carbon fibers, aramid fibers and/or natural fibers. The fiber lay-up comprises, for example, fibers in dry condition, i.e., without resin and/or pre-impregnated fibers (prepreg). The fiber lay-up includes, for example, a core material such as wood, balsa, PET foam and/or PVC foam. The core material allows to reduce the weight of the final fiber-reinforced resin laminate while maintaining a sufficient rigidity and/or strength of the blade.

The resin includes, for example, thermosets, thermoplastics, epoxy, polyurethane, vinyl ester and/or polyester.

The resin is infused and cured from inside the wind turbine blade cavity. The resin is, for example, cured by applying heat.

The fiber lay-up forms, once infused with resin and cured, a joining portion joining the blade sections inside. The cured joining portion is, in particular, a fiber-reinforced resin laminate.

The phrase "a cured joining portion joining the blade sections inside" is to say that the cured joining portion joins or connects the blade sections on their inside surfaces, i.e., surfaces of the blade sections that face an open or closed cavity within each blade section.

In step b) of the method, the cross-section size of the mandrel tool is, for example, reduced from an original cross-section size to a smaller cross-section size. In step d) of the method, the original cross-section size of the mandrel tool is, for example, re-established.

An enveloping surface of the mandrel tool (e.g., of the outer surfaces of the at least two mandrel portions) has, for example, an airfoil section. In particular, when the mandrel tool is in its original extended state—i.e., before step b) and after step d)—an enveloping surface of the mandrel tool has an airfoil section.

The cross-section of the mandrel tool in its original extended state is, thus, in particular an airfoil section. At a certain position with respect to the longitudinal length of the blade, the cross-section size of the mandrel tool is slightly smaller than a cross-section size of the manufactured blade.

The airfoil section of the enveloping surface of the mandrel tool comprises a leading edge, a trailing edge, a suction side and a pressure side. A chord length of an airfoil section is the distance between its leading edge and its trailing edge. A thickness of an airfoil section is the maximum distance between its upper and lower surfaces (its suction and pressure sides).

The mandrel tool comprises, for example, actuator means to retract and/or extend at least one of the mandrel portions.

In embodiments, the method includes, before step e), the steps of covering the fiber lay-up and the adjacent blade sections at least partially with a vacuum bag, and applying vacuum to a space covered by the vacuum bag, and wherein, in step e), the resin is infused due to the generated vacuum.

In embodiments, each of the adjacent blade sections comprises an outwardly tapered portion such that the outwardly tapered portions form a common recess. Further, the mandrel tool is arranged inside the adjacent blade sections such that the fiber lay-up is arranged in the common recess when the cross-section size of the mandrel tool is increased.

By having the outwardly tapered portions of the adjacent blade sections, the outer surfaces of the blade sections can be finished prior to the joining process.

In particular, each of the adjacent blade sections comprises at an end portion thereof an outwardly tapered portion. In particular, each of the blade sections is tapered outwardly towards a joining interface with the other blade section. Further, each of the blade sections is tapered outwardly such that each of the blade sections forms an inner recess. The inner recesses of the blade sections form a common recess when the blade sections are arranged adjacent to each other. The common inner recess is filled by the fiber lay-up when the cross-section size of the mandrel tool is increased.

Particularly, a thickness of a blade shell, beam and/or web decreases towards the interface with the other blade section to form the outwardly tapered portion. The outwardly tapered portion may, for example, be configured such that the thickness of its blade shell, beam and/or web decreases linearly towards the interface with the other blade section. The outwardly tapered portion may, for example, be configured such that the thickness of its blade shell, beam and/or web decreases stepwise or curved towards the interface with the other blade section.

In embodiments, each blade section may comprise at a certain end portion thereof two or more outwardly tapered portions. In particular, each of the two or more outwardly tapered portions of a first blade section corresponds to an outwardly tapered portion of a second blade section. Further, each of the two or more outwardly tapered portions of the first and second blade sections form a common recess.

According to an embodiment, the cross-section size of the mandrel tool is reduced by reducing a height of the mandrel tool and/or a width of the mandrel tool.

A height of the mandrel tool is, for example, a thickness of an airfoil section of the mandrel tool. A width of the mandrel tool is, for example, a chord length of the airfoil section of the mandrel tool.

For example, the at least two mandrel portions comprise at least one upper mandrel portion. Further, the height of the mandrel tool is reduced by retracting the at least one upper mandrel portion towards the frame (and towards a lower mandrel portion).

For example, the at least two mandrel portions comprise at least one trailing edge mandrel portion. Further, the width of the mandrel tool is reduced by retracting the at least one trailing edge mandrel portion towards the frame (and towards a leading-edge mandrel portion).

According to a further embodiment, the method includes, during step b) or between step b) and step c) the step of folding the fiber lay-up inwards.

By folding the fiber lay-up inwards, the behaviour of the fiber lay-up during reducing the cross-section size of the mandrel tool, inserting it and increasing its cross-section size again can be better controlled. For example, one or more folds of the fiber lay-up extending along the longitudinal direction of the mandrel tool can be generated in a controlled manner. Hence, undesired folds and dislocations of the fiber lay-up during or after reducing the cross-section size of the mandrel tool can be avoided. Further, an interference of the fiber lay-up with the blade sections during inserting the mandrel tool is reduced.

The fiber lay-up is, for example, folded inwards at the leading-edge, the trailing edge or an upper side (pressure side) of the mandrel tool.

According to a further embodiment, the mandrel tool comprises at least one gap extending along a longitudinal direction of the mandrel tool and arranged, as seen in cross-section, between two adjacent mandrel portions, and wherein the fiber lay-up is folded inwards into the at least one gap.

Having the gap and folding the fiber lay-up inwards into the gap allows to even better control the arrangement of the fiber lay-up during retracting and expanding the mandrel tool.

According to a further embodiment, the fiber lay-up is tensioned during and/or after folding it inwards.

Tensioning the fiber lay-up during and/or after folding it inwards allows to even better control the arrangement of the fiber lay-up during retracting, inserting and expanding the mandrel tool.

The fiber lay-up is, for example, tensioned during step b), c) and/or d).

The fiber lay-up is, for example, tensioned by gravity and/or an applied tensioning force.

For example, when reducing the mandrel tool in height, a fold of the fiber lay-up may hang downward into a gap between two upper mandrel portions and is tensioned due to gravity.

For example, when reducing the mandrel tool in height and/or width, a pushing and/or pulling force may be applied to the fiber lay-up pushing and/or pulling it inwards towards the frame.

According to a further embodiment, the method includes, after step a) and before step b) the step of fixing at least one moveable longitudinal member to the mandrel tool such that it is arranged along the longitudinal direction of the mandrel tool and outside the at least one gap, and wherein the fiber lay-up is folded inwards by moving the at least one longitudinal member into the at least one gap.

The at least one longitudinal member is, for example, a bar. One or more longitudinal members are, for example, fixed to the mandrel tool at the leading-edge and/or at the trailing edge.

The at least one longitudinal member may be used for tensioning the fiber-lay by pushing the fiber lay-up inwards.

In embodiments, the method includes, after step c), a step of dismounting and removing the at least one moveable longitudinal member from the mandrel tool.

According to a further embodiment, the at least two mandrel portions comprise at least two upper mandrel portions and at least two lower mandrel portions. Further, the method includes, during step a), the step of arranging a web element between the at least two upper mandrel portions and between the at least two lower mandrel portions. The web element includes a first portion, a second portion and a middle portion arranged between the first and second portions. Furthermore, the method includes, before step b), the step of removing the middle portion. The method also includes, after step d), the step of re-arranging the middle portion between the first and second portions of the web element.

The steps of removing and re-arranging a middle portion of a web element allow to more easily reduce a height of the mandrel tool even when using a pre-casted web element.

The mandrel tool may comprise one or more clamps to fix the first and/or second portions of the web element during the absence of the middle portion.

According to a further embodiment, the method includes, after step b) and before step c), the step of strapping the fiber-lay up to the mandrel tool.

By strapping the fiber-lay up to the mandrel tool, the fiber lay-up can be secured to the mandrel tool during arranging the mandrel tool inside the adjacent blade sections.

For example, several straps distributed along the longitudinal direction of the mandrel tool may be fixed to the mandrel tool. Furthermore, the mandrel tool with the fiber lay-up may also be wrapped in a foil, after step b) and before step c) and before applying the one or more straps.

According to a further embodiment, the fiber lay-up comprises a fiber lay-up forming, once infused and cured, a shell joint joining a shell of a first one of the adjacent blade sections with a shell of a second one of the adjacent blade sections. Additionally, or alternatively, the fiber lay-up comprises a fiber lay-up forming, once infused and cured, one or more beam joints joining one or more beams of a first one of the adjacent blade sections with one or more corresponding beams of a second one of the adjacent blade sections. Additionally, or alternatively, the fiber lay-up comprises a fiber lay-up forming, once infused and cured, a web joint joining a web of a first one of the adjacent blade sections with a web of a second one of the adjacent blade sections.

Arranging one, several or all of the fiber lay-ups on the mandrel tool allows to provide a light-weight and strong blade section joint including a shell joint, one or more beam joints and/or a web joint in a more efficient manufacturing process. In particular, several or all of the shell, beam(s) and/or web may be joined in a single process step by infusing and curing the resin.

The one or more beams comprise, for example, a pressure-side beam, a suction-side beam, a leading-edge beam and/or a trailing edge beam.

The fiber lay-up, e.g., for the shell joint, comprises, for example, circumferentially arranged plies.

The (shear) web connects, in particular, the blade shells of the pressure side and the suction side in the interior cavity of the manufactured blade. The web provides shear strength to the blade.

A web element arranged in step a) in the mandrel tool may comprise a pre-casted web element and in addition a fiber lay-up (dry fiber lay-up and/or prepreg) at a connection region between the web element and the fiber lay-up for an upper and lower shell.

Alternatively, a web element arranged in step a) in the mandrel tool may comprise only a fiber lay-up (dry fiber lay-up and/or prepreg) and no pre-casted web element.

According to a further embodiment, the mandrel tool is arranged partially inside a first one of the blade sections such that a portion of the mandrel tool protrudes from the first one of the blade sections, and a second one of the blade sections is arranged adjacent to the first one of the blade sections such that the second one of the blade sections receives the portion of the mandrel tool protruding from the first one of the blade sections.

Inserting the mandrel tool partially into the first one of the blade sections and arranging the second one of the blade sections on the protruding portion of the mandrel tool allows to more easily arrange the mandrel tool. Further, it allows to better position the second one of the blade sections adjacent to the first one of the blade sections.

According to embodiments, the mandrel tool comprises an inner cavity between the mandrel portions. Having the inner cavity provides access for a worker. A worker may, for example, access an outboard blade section through the inner cavity when the mandrel tool is inserted into the adjacent blade sections. Further, a worker can, for example, seal a vacuum bag and/or connect vacuum and resin inlet hoses from within cavity.

According to embodiments, the mandrel tool comprises one or more resin inlets and/or one or more vacuum hoses. The resin inlets and/or vacuum hoses are, for example, connectable to a space covered by a vacuum bag, the vacuum bag covering the fiber lay-up and the adjacent blade sections at least partially.

According to embodiments, the mandrel tool comprises a heating system. The heating system allows to heat the resin up to, for example, 70 degrees Celsius to cure the resin.

According to embodiments, the mandrel tool is configured for removing it through a root end of the blade after joining the blade sections. For example, the mandrel tool can be removed in parts through the root end.

According to embodiments, the mandrel tool comprises one or more terminals for electrical grounding. For example, the mandrel tool comprises one terminal for electrical grounding on each of two end portions of the mandrel tool.

According to embodiments, the mandrel tool comprises inspection gates to visually inspect the fiber lay-up after arranging it.

According to a further aspect, a mandrel tool for joining two blade sections of a wind turbine blade is provided. The mandrel tool is configured for arranging it inside adjacent blade sections. The mandrel tool comprises a frame, and, as seen in cross-section, at least two mandrel portions connected to the frame. At least one of the mandrel portions is connected to the frame by actuator means configured for retracting and/or extending the mandrel portion towards/ away from the frame-Furthermore, an outer surface of the at least two mandrel portions is configured for at least partially supporting a fiber lay-up for a joining portion.

According to an embodiment of the further aspect, the actuator means comprise one or more lifting jacks and/or one or more retractable rods.

According to a further embodiment of the further aspect, the mandrel includes:
- at least one longitudinal member arranged along a longitudinal direction of the mandrel tool, and
- at least one gap extending along the longitudinal direction of the mandrel tool and arranged between two adjacent mandrel portions,
- wherein the at least one longitudinal member is arranged outside of the at least one gap and is configured to be moveable into the respective gap.

According to a further embodiment of the further aspect, the mandrel tool includes guiding rods connected to the frame and configured for guiding the mandrel tool during arranging it into the adjacent blade sections.

According to a further embodiment of the further aspect, the at least two mandrel portions include at least one upper mandrel portion, at least one lower mandrel portion, at least one leading-edge mandrel portion and/or at least one trailing edge mandrel portion.

The embodiments and features described with reference to the method of the present invention apply mutatis mutandis to the mandrel tool.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
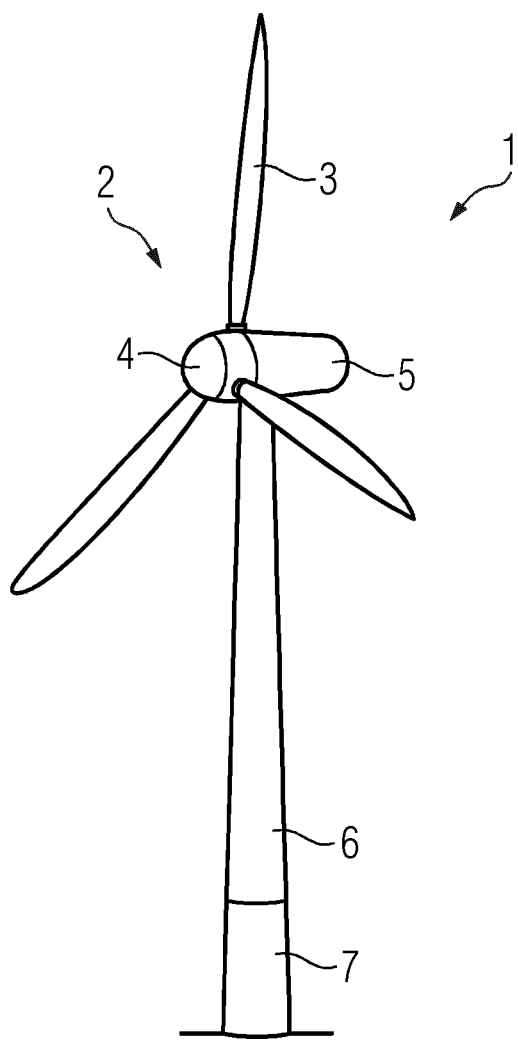
FIG. 1 shows a wind turbine according to an embodiment.

FIG. 1 shows a wind turbine 1 according to an embodiment. The wind turbine 1 comprises a rotor 2 having one or more blades 3 connected to a hub 4. The hub 4 is connected to a generator (not shown) arranged inside a nacelle 5. During operation of the wind turbine 1, the blades 3 are driven by wind to rotate and the wind's kinetic energy is converted into electrical energy by the generator in the nacelle 5. The nacelle 5 is arranged at the upper end of a tower 6 of the wind turbine 1. The tower 6 is erected on a foundation 7 such as a monopile driven into the ground or seabed.

Figure 2:
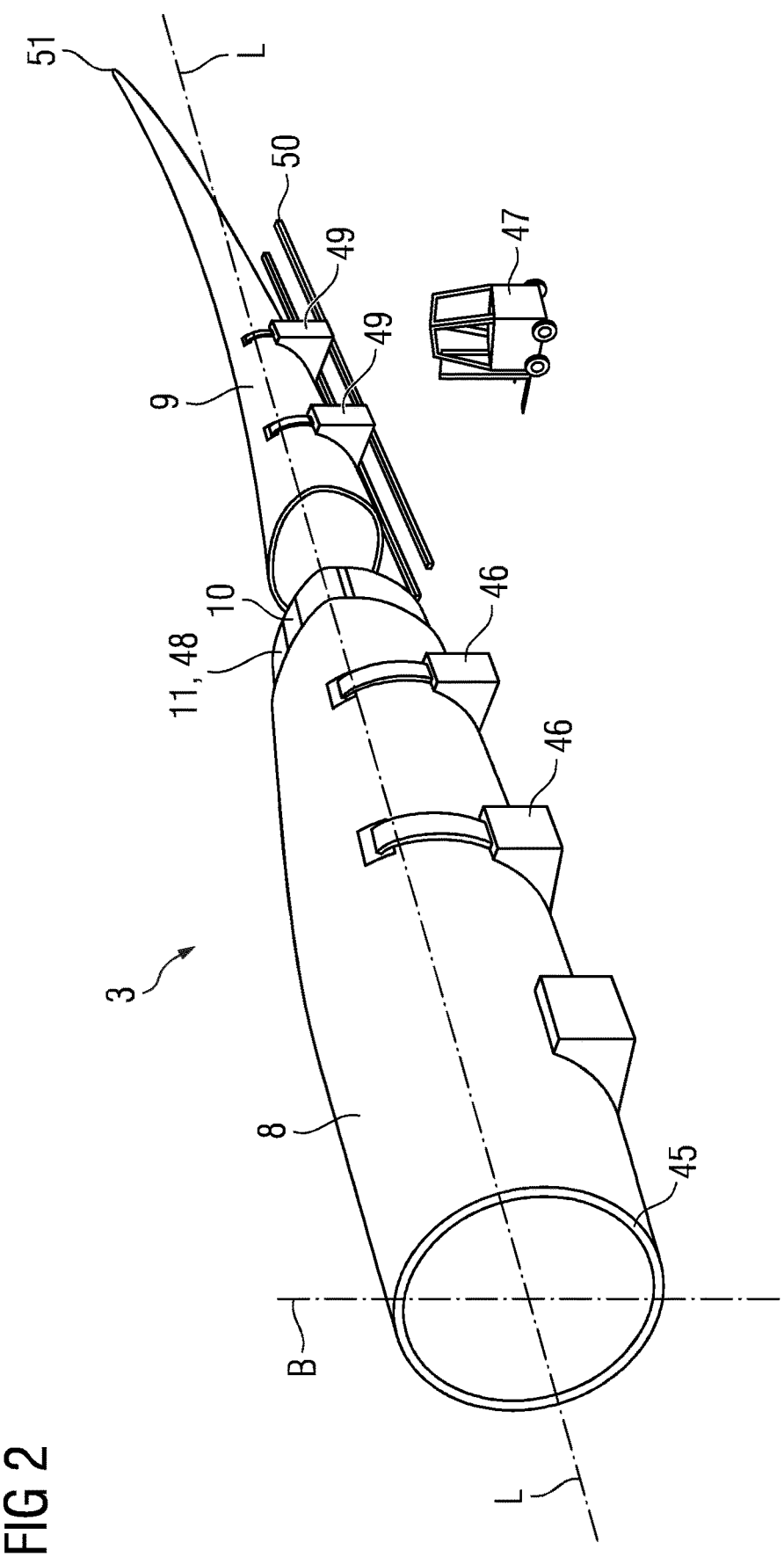
FIG. 2 shows a process of joining two blade sections of a blade of the wind turbine of FIG. 1 by a fiber lay-up arranged on a mandrel tool.

As shown in FIG. 2, the blades 3 of the wind turbine 1 are manufactured from two or more lengthwise blade sections 8, 9. The lengthwise blade sections 8, 9 are joined by using a fiber lay-up 10 arranged on a mandrel tool 11, as described in the following.

Figure 3:
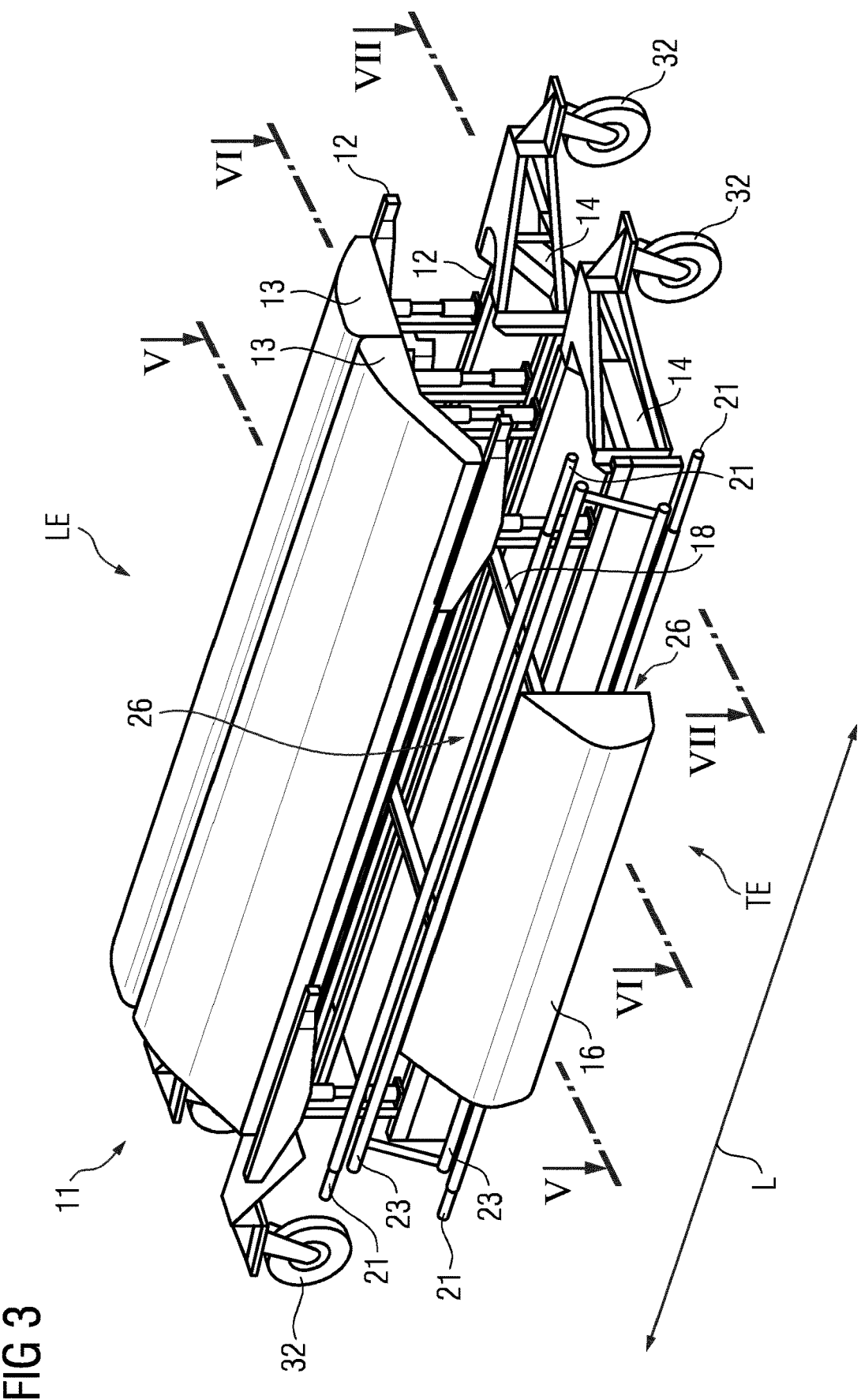
FIG. 3 shows a perspective view of the mandrel tool from FIG. 2 viewed from the tool trailing edge side.
Figure 4:
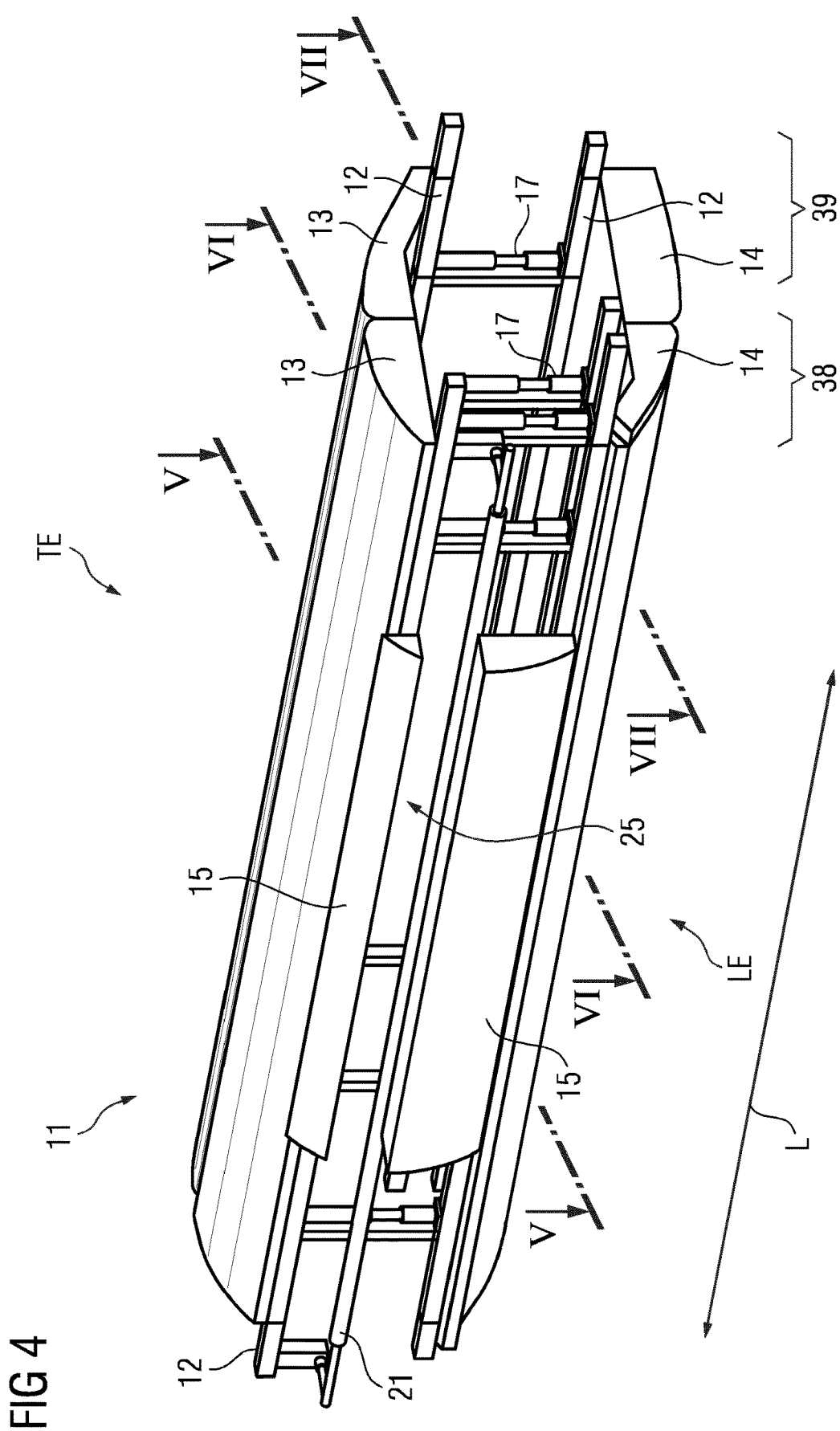
FIG. 4 shows a perspective view of the mandrel tool from FIG. 2 viewed from the tool leading-edge side.
Figure 5:
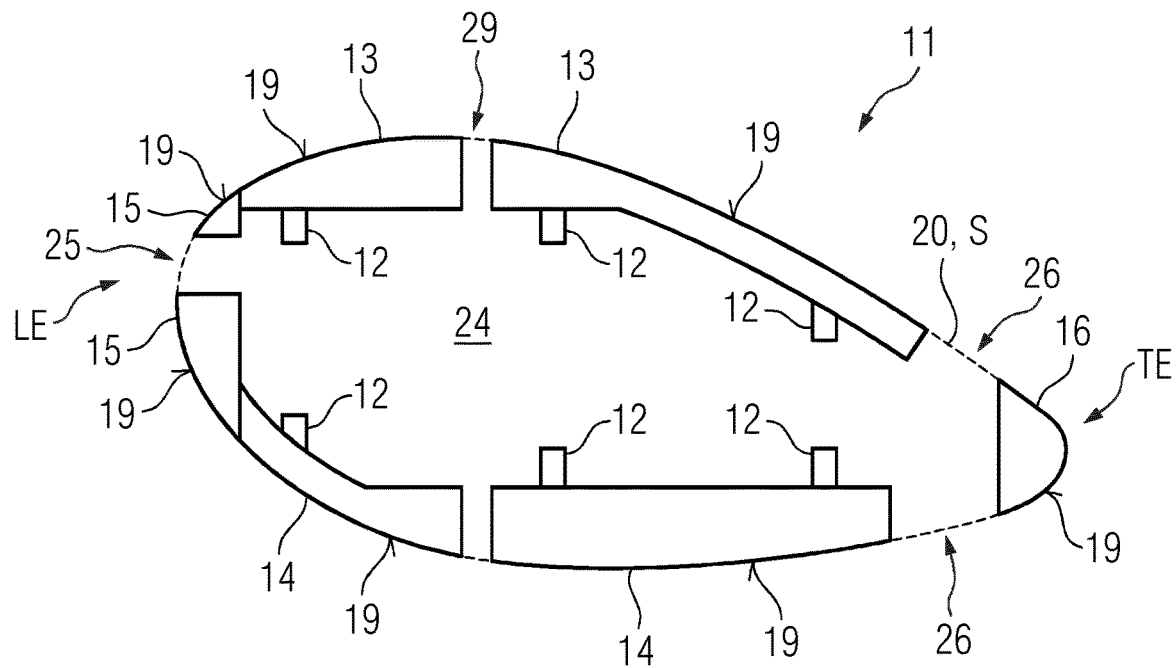
FIG. 5 shows the mandrel tool in a cross-section taken along plane position V of FIGS. 3 and 4.
Figure 6:
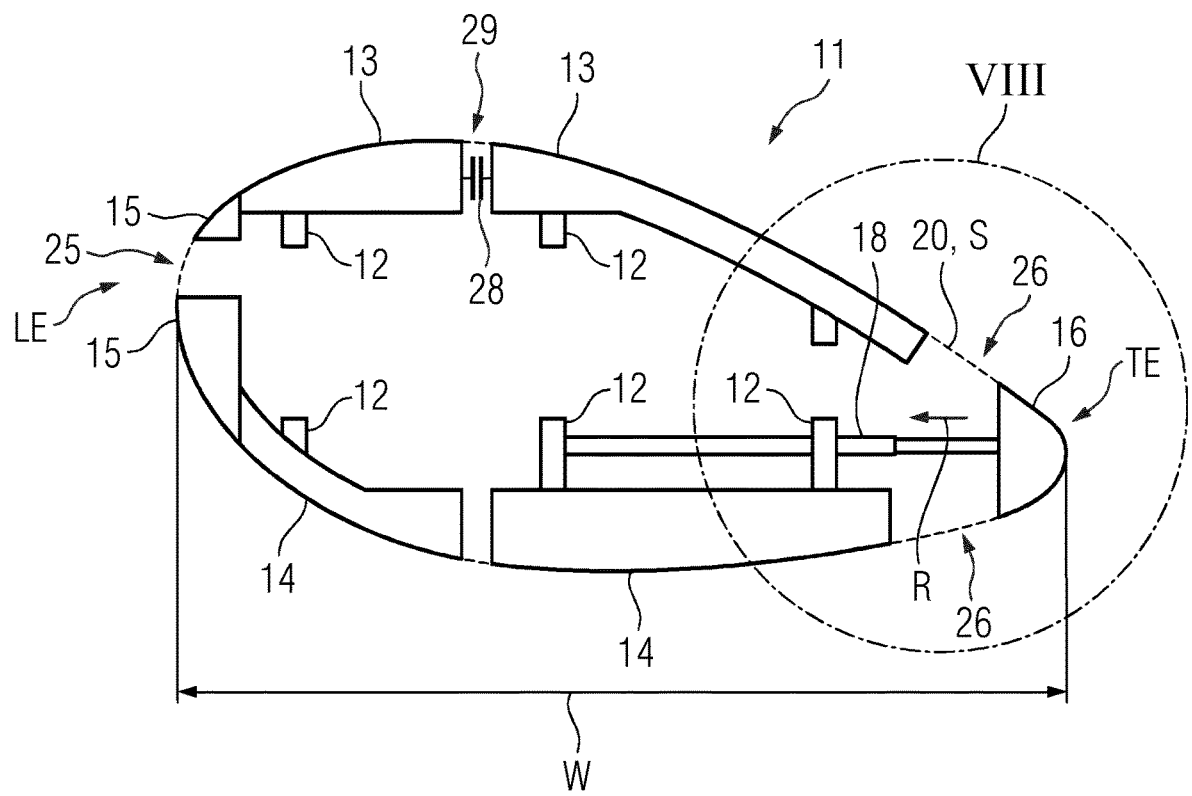
FIG. 6 shows the mandrel tool in a cross-section taken along plane position VI of FIGS. 3 and 4.
Figure 7:
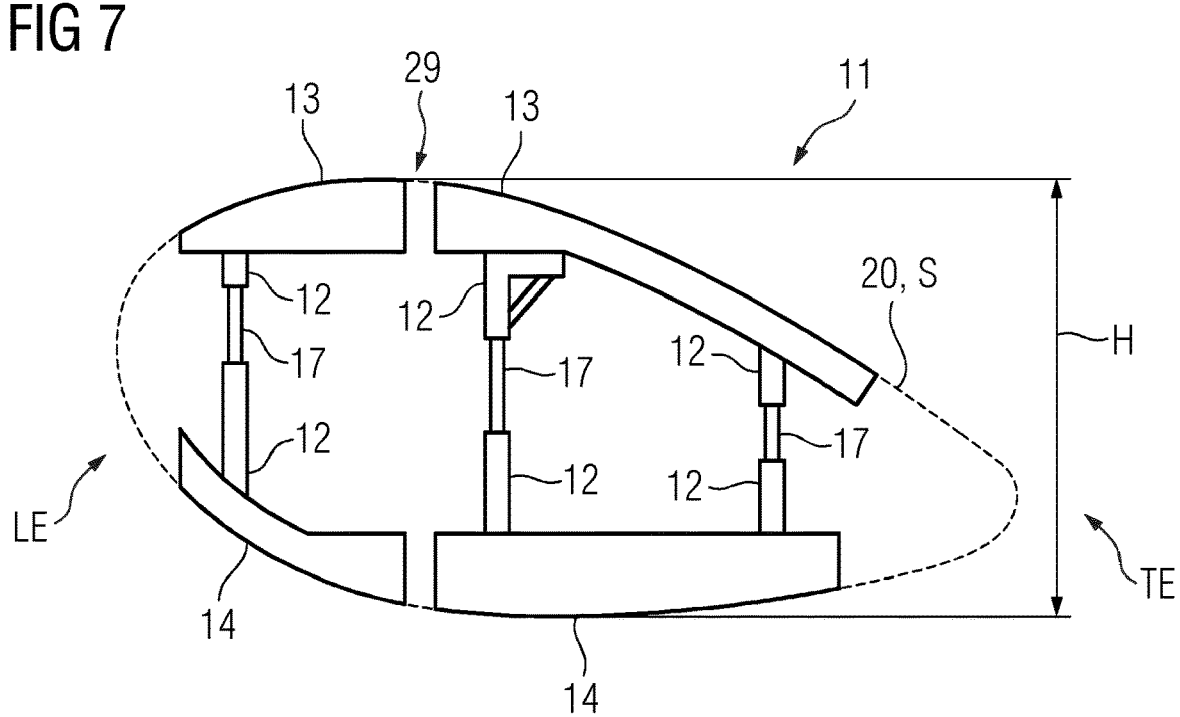
FIG. 7 shows the mandrel tool in a cross-section taken along plane position VII of FIGS. 3 and 4.

FIG. 3 shows a perspective view of the mandrel tool 11 viewed from a trailing edge side TE of the mandrel tool 11. FIG. 4 shows a perspective view of the mandrel tool 11 viewed from a leading-edge side LE of the mandrel tool 11. FIGS. 5, 6 and 7 show cross-section views of the mandrel tool 11 along lines V, VI and VII in FIGS. 3 and 4, respectively.

As shown in FIGS. 3 to 7, the mandrel tool 11 comprises a frame 12. Further, the mandrel tool 11 comprises at least two mandrel portions 13, 14, 15, 16 connected to the frame 12. In the shown example, the mandrel tool 11 comprises two upper mandrel portions 13, two lower mandrel portions 14, two leading-edge mandrel portions 15 and one trailing edge mandrel portion 16 (FIG. 5).

It is noted that in the view of FIG. 3, the two leading-edge mandrel portions 15 are not visible. In the view of FIG. 4, the trailing edge mandrel portion 15 is not visible.

As visible in FIGS. 3, 4 and 7, the two upper mandrel portions 13 are connected to a lower portion of the frame 12 and to the lower mandrel portions 14 by actuator means 17. The actuator means 17 are, for example, lifting jacks 17. Using the lifting jacks 17, the upper mandrel portions 13 can be lowered towards the lower mandrel portions 14. In this way, a height H of the mandrel tool 11 (FIG. 7) can be reduced.

In addition, the trailing edge mandrel portion 16 is connected to the frame 12 by actuator means 18, as shown in FIGS. 3 and 6. The actuator means 18 are, for example, retracting rods 18. Using the retracting rods 18, the trailing edge mandrel portion 16 can be retracted in a direction R towards the frame 12. In this way, a width W of the mandrel tool 11 (FIG. 6) can be reduced.

Outer surfaces 19 of the mandrel portions 13, 14, 15, 16 (FIG. 5) define an enveloping surface 20 of the mandrel tool 11 (FIGS. 5-7). The enveloping surface 20 has an airfoil section at least when the mandrel tool 11 is in its original extended state.

Figure 10:
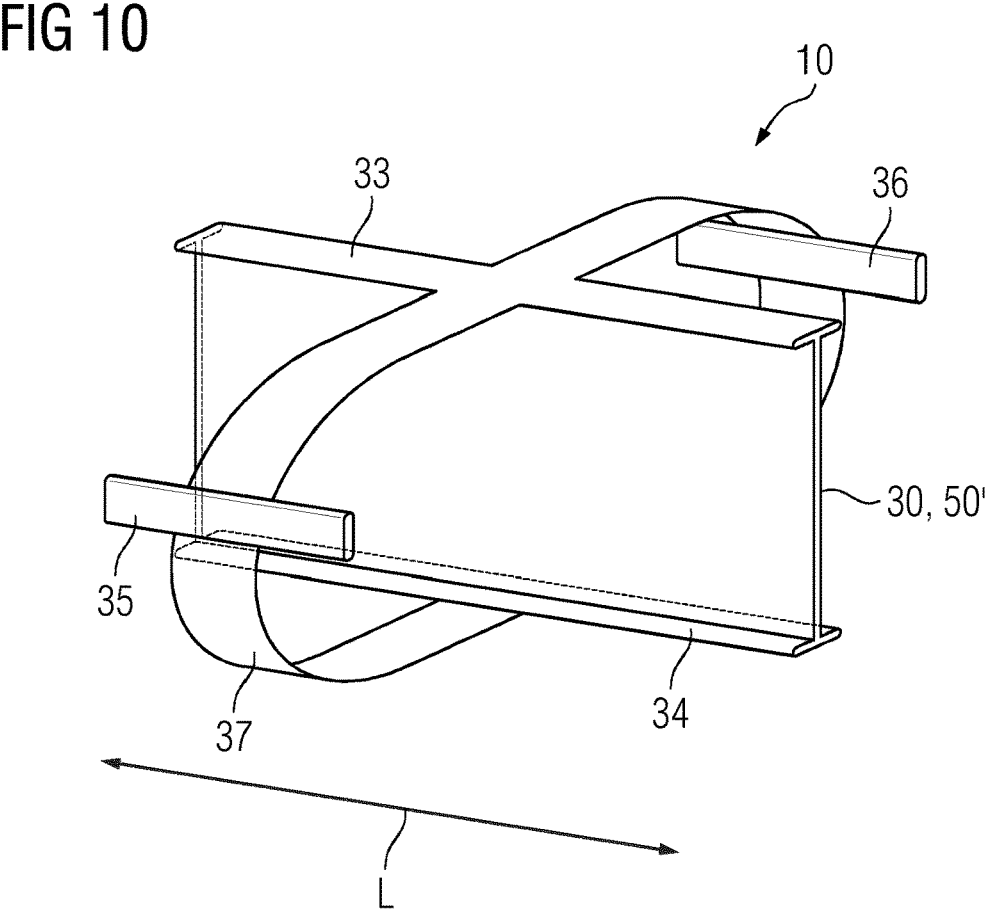
FIG. 10 shows the fiber lay-up of FIG. 2 in more detail.

The outer surfaces 19 of the mandrel portions 13, 14, 15, 16 are configured to at least partially support the fiber lay-up 10 (FIGS. 2, 10).

The mandrel tool 11 comprises an inner cavity 24 between the mandrel portions 13, 14, 15, 16, as shown in FIGS. 5 to 7. When the mandrel tool 11 is inserted into the adjacent blade sections 8, 9, an operator can access, for example, the outboard blade section 9 through the inner cavity 24. Further, a worker can, for example, seal a vacuum bag and/or connect vacuum and resin inlet hoses from the cavity 24.

The mandrel tool 11 further comprises at least one moveable longitudinal member 21 arranged along a longitudinal direction L of the mandrel tool 11. In the shown example, the mandrel tool 11 comprises one longitudinal member 21 at the leading-edge LE (FIG. 4) and two longitudinal members 21 at the trailing edge TE (FIG. 3). The longitudinal members 21 in the shown example are bars. The bars 21 are configured for actively folding the fiber lay-up 10 inwards into/towards an inside 24 of the mandrel tool 11 (FIG. 5) when reducing the cross-section size S (for example the width W and the height H) of the mandrel tool 11. The bars 21 are releasably attached to the mandrel tool 11, for example to the frame 12 and/or to one or more of the mandrel portions 13, 14, 15.

Figure 8:
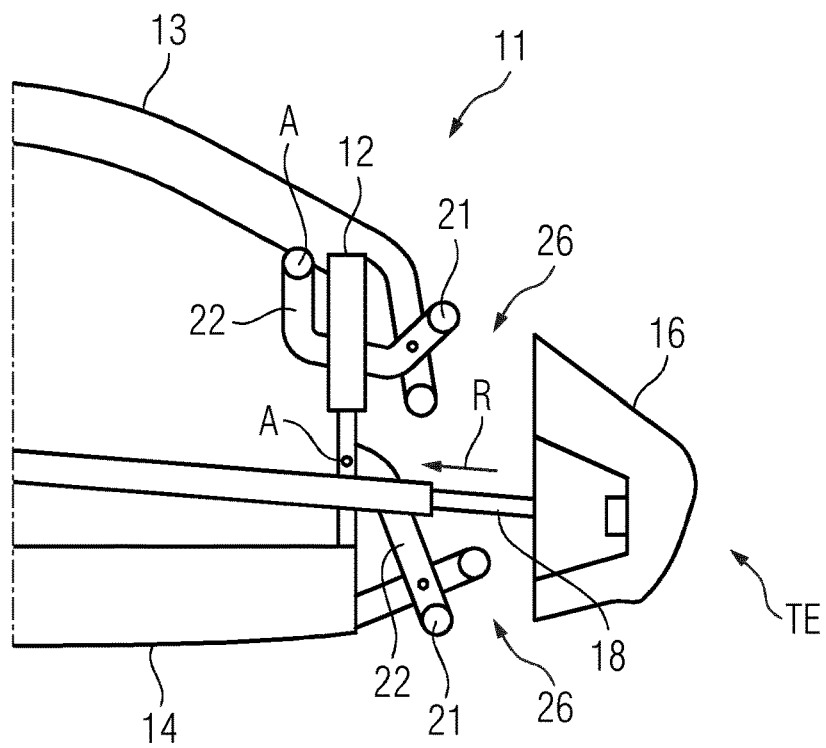
FIG. 8 shows a portion VIII of FIG. 6.

FIG. 8 shows a portion VIII of FIG. 6 displaying the two bars 21 attached to the frame 12 at the trailing edge TE. Each of the bars 21 is connected to an arm 22. Each arm 22 is pivotably connected to the frame 12 such that it can pivot about an axis A to move the respective bar 21. There may be further longitudinal members (bars) 23 arranged next to each bar 21, as visible in FIG. 3.

Furthermore, the mandrel tool 11 comprises at least one gap 25, 26 extending along the longitudinal direction L of the mandrel tool 11. In the shown example, the mandrel tool 11 comprises the gap 25 (FIGS. 4 and 5) arranged between the two adjacent mandrel portions 15. Further, the mandrel tool 11 comprises two gaps 26 (FIGS. 3 and 5) arranged between the two adjacent mandrel portions 13 and 16 and 14 and 16, respectively. The gaps 25, 26 are configured for receiving a fold 27 (FIG. 12) of the fiber lay-up 10 when the fiber lay-up 10 is folded inwards by the bars 21 moving into the gaps 25, 26.

In particular, the bar 21 at the leading-edge LE (FIG. 4) is arranged outside of the gap 25 and is configured to move into the gap 25 to fold the fiber lay-up 10 into the gap 25. Further, the two bars 21 at the trailing edge TE (FIGS. 3 and 8) are arranged outside of the two gaps 26 and are configured to move into the gaps 26 to fold the fiber lay-up 10 into the gaps 26, respectively.

The mandrel tool 11 may further comprise a clamp 28 connected in a gap 29 between the two upper mandrel portions 13, as shown in FIG. 6. The clamp 28 is configured to temporarily fix a (portion of a) web element 30 (FIG. 11) during and after reducing the height H of the mandrel tool 11. The (portion of the) web element 30 may be a pre-casted element and/or may comprise a (dry or prepreg) fiber lay-up. Any suitable clamp or clamping mechanism can be used for the clamp 28.

Figure 9:
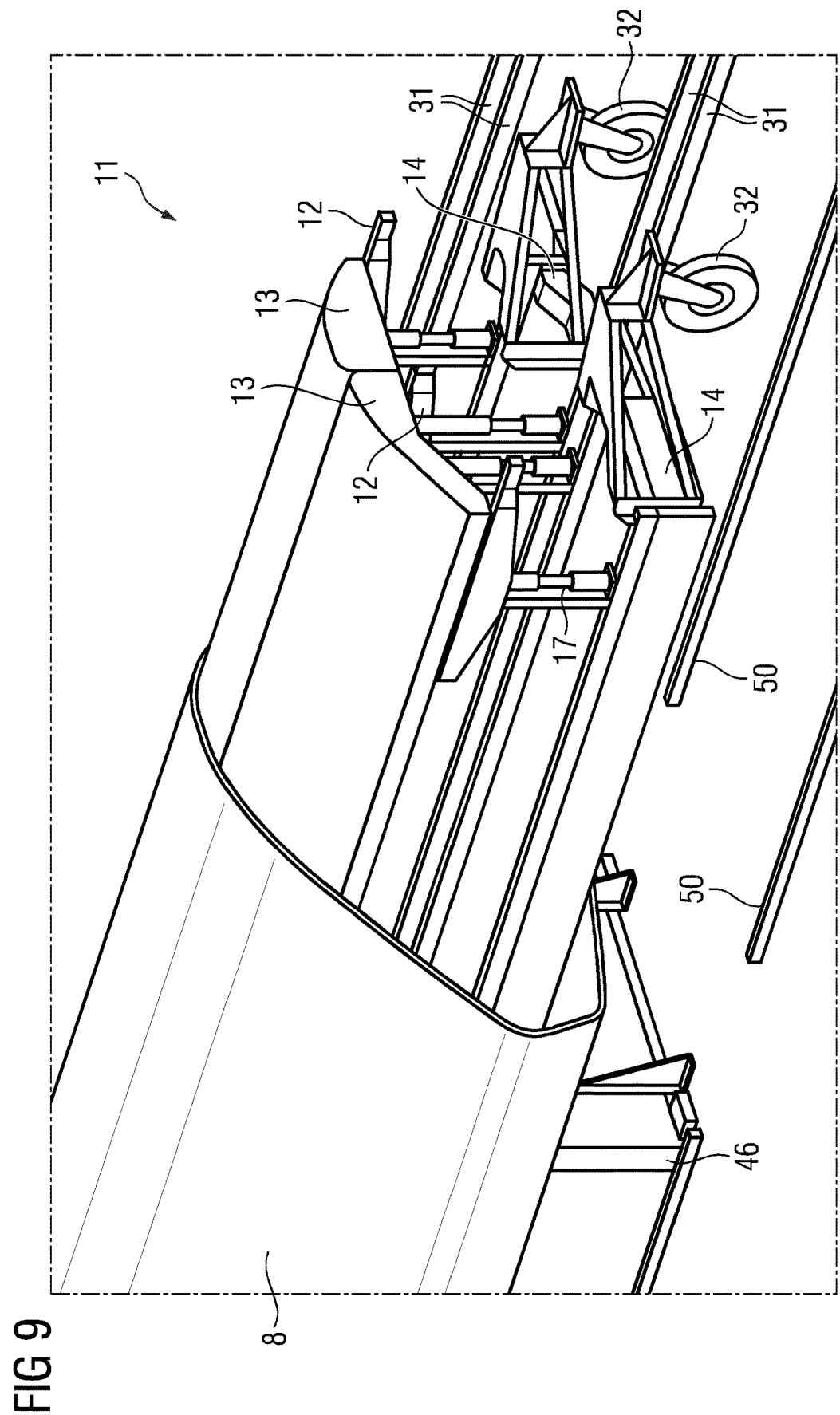
FIG. 9 shows a process of inserting the mandrel tool into a first blade section.

As shown in FIG. 9, the mandrel tool 11 may also include guiding rods 31 connected to the frame 12. The guiding rods 31 are configured for guiding the mandrel tool 11 during arranging it into the adjacent blade sections 8, 9. In the shown example, the mandrel tool 11 comprises four guiding rods 31. However, the mandrel tool may also include a different number of guiding rods 31.

As shown in FIGS. 3 and 9, the mandrel tool 11 may also include wheels 32 (releasably) connected to the frame 11 for moving the mandrel tool 11.

In the following, a method for joining the two blade sections 8,9 (FIG. 2) by the mandrel tool 11 is described.

In a first step S1 of the method, the fiber lay-up 10 is arranged on the mandrel tool 11.

FIG. 10 shows the fiber lay-up 10 without the mandrel tool 11 for clarity. The fiber lay-up 10 comprises a fiber lay-up 33 for a pressure-side beam joint and a fiber lay-up 34 for a suction-side beam joint. Further, the fiber lay-up 10 comprises a fiber lay-up 35 for a leading-edge beam joint and a fiber lay-up 36 for a trailing edge beam joint. Furthermore, the fiber lay-up 10 comprises a fiber lay-up 37 for a shell joint.

Also shown in FIG. 10 is a web element 30, 30'. The web element 30 is, for example, a pre-casted web element 30. In another embodiment, the fiber lay-up 10 may also comprise a fiber lay-up 30' for a web joint.

Figure 11:
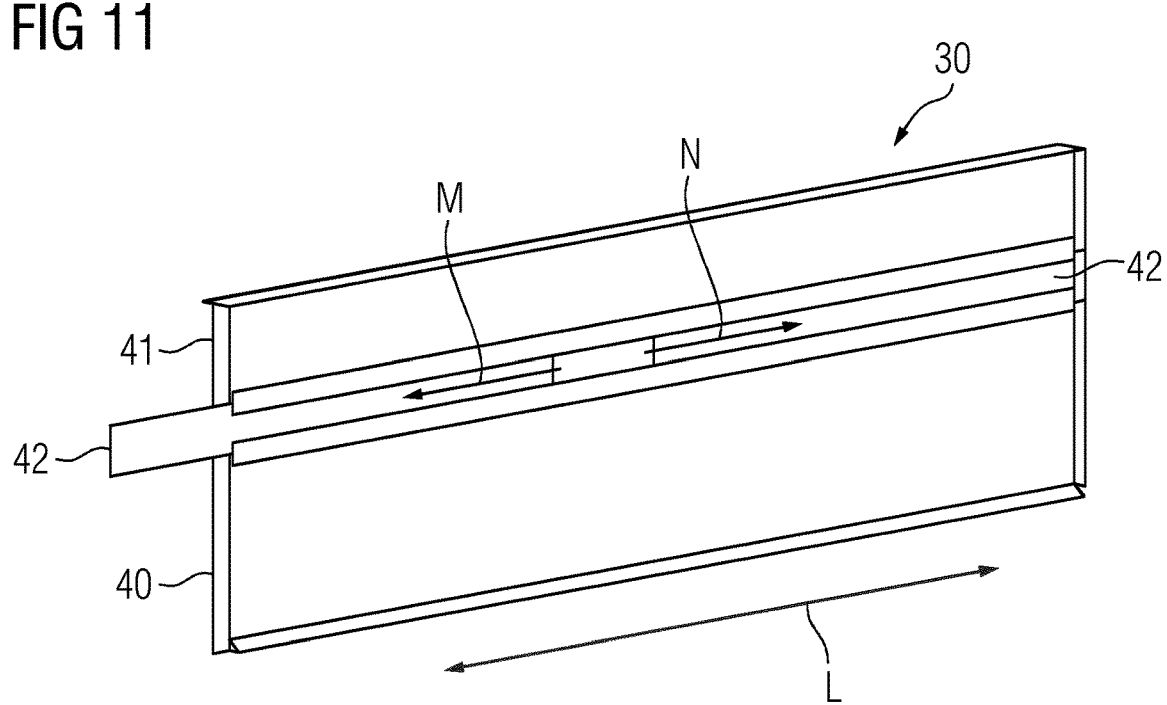
FIG. 11 shows a web element of the fiber lay-up of FIG. 10.

FIG. 11 shows a detailed view of the web element 30 which is in this example a pre-casted web element. The web element 30 comprises a first portion 40 and a second portion 41. Further, the web element 30 comprises a middle portion 42 arranged between the first and second portions 40, 41. The middle portion 42 can be removed from the web element 30, as indicated by the arrows M and N. In the shown example, the middle portion 42 comprises two parts which can be removed to the left (direction M) and right side (direction N). In another example, the middle portion may be a single element which can be removed in direction M and/or in direction N.

For pre-packing the fiber lay-up 10 on the mandrel tool 11, firstly a mold or packing table (not shown) is provided. On the mold or packing table, the fiber lay-up 34 (FIG. 10) for the suction-side beam joint and a part of the fiber lay-up 37 for the shell joint are provided. Then, vacuum bags (only shown in FIG. 13, reference sign 62) are provided on the fiber lay-up 34 and the lower portion of the fiber lay-up 37. Next, for example, the web element 30 comprising all portions 40, 41, 42 (FIG. 11) is arranged.

In the next step, the mandrel tool 11 is arranged. In particular, the mandrel tool 11 can be divided into a leading-edge mandrel tool part 38 and a trailing edge mandrel tool part 39, as shown in FIG. 4. Both the leading-edge mandrel tool part 38 and the trailing edge mandrel part 39 are arranged on the fiber lay-ups 34, 37 such that the web element 30 is arranged in between them. The web element 30 (e.g., its second portion 41) may be clamped to the upper mandrel portions 13 by the clamp 28 (FIG. 6).

Further, the vacuum bags (62, FIG. 13) are wrapped around the leading-edge mandrel tool part 38 and the trailing edge mandrel part 39 of the mandrel tool 11.

Next, the fiber lay-up 33 for the pressure-side beam joint, the fiber lay-up 35 for the leading-edge beam joint, the fiber lay-up 36 for the trailing edge beam joint, and the remaining of the fiber lay-up 37 for the shell joint are provided. Finally, the vacuum bags (62, FIG. 13) are arranged such that all fiber lay-ups 33, 34, 35, 36 and 37 and the web element 30 are covered on one side thereof by a vacuum bag (62, FIG. 13).

In step S2 of the method, the bars 21 are fixed to the frame 12 of the mandrel tool 11, as shown in FIGS. 3, 4 and 8. The bars 21 are fixed to the mandrel tool 11 such that the bars 21 are arranged outside of the gap 25 at the leading-edge LE (FIG. 4) and outside of the two gaps 26 at the trailing edge (FIGS. 3 and 8).

Figure 12:
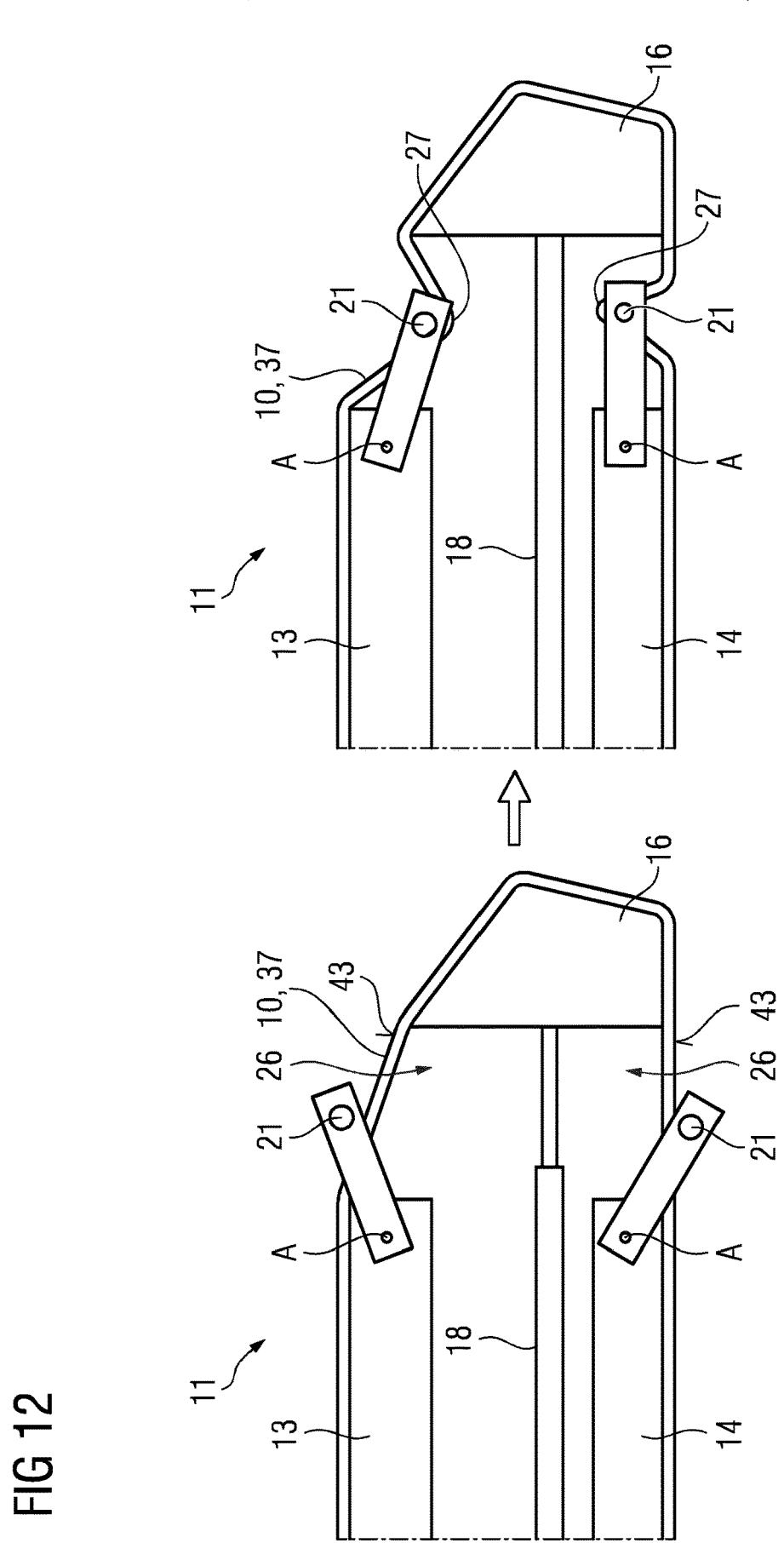
FIG. 12 shows schematically a process of reducing a width of the mandrel tool of FIGS. 3 and 4 and folding the fiber lay-up inwards.

When fixing the bars 21 to the mandrel tool 11 (step S2), the fiber lay-up 10 is already arranged on the mandrel tool 11 (step s1). Thus, the bars 21 are arranged outside of the fiber lay-up 10, in particular outside of the fiber lay-up 37 for the shell joint (FIG. 12).

In step S3 of the method, the cross-section size S of the mandrel tool 11 is reduced. In particular, the height H of the mandrel tool 11 is reduced by retracting the lifting jacks 17 such that the upper mandrel portions 13 are lowered (FIG. 7).

Furthermore, also the width W of the mandrel tool 11 is reduced by retracting the retracting rods 18 in the direction R such that the leading-edge mandrel portion 16 is retracted towards the frame 12 and the inside 24 of the mandrel tool 11 (FIG. 6).

At the beginning of step S3 and before reducing the height H of the mandrel tool, the middle portion 42 of the web element 30 may be removed from the web element 30, as shown in FIG. 11.

In step S4 of the method, the fiber lay-up 11 is folded inwards and tensioned. Desirably, step S4 is carried out simultaneously with step S3. When folding the fiber lay-up 11 inwards, in particular, the fiber lay-up 37 for the shell joint and the fiber lay-up 33 for the pressure-side beam joint are folded inwards (FIG. 10).

FIG. 12 shows schematically the process of retracting the trailing edge mandrel portion 16 inwards and simultaneously folding the fiber lay-up 10 (in particular, the fiber lay-up 37 for the shell joint) inwards by the bars 21. The left panel in FIG. 12 illustrates the initial state in which the mandrel tool 11 is in its original extended state, the fiber lay-up 10, 37 is already arranged on the mandrel tool 11 and the bars 21 were already fixed to the mandrel tool 11. In the right panel of FIG. 12, the two bars 21 were pivoted around the axis A and moved into the two gaps 26, respectively. When the bars 21 move into the gaps 26, they apply a pushing force onto an outer surface 43 of the fiber lay-up 10, 37. Further, each bar 21 folds the fiber lay-up 10, 37 into a respective fold 27. Thereby, the fiber lay-up 10, 37 is tensioned.

Furthermore, the fiber lay-up 10, 33 (FIG. 10) can be folded into the gap 29 between the two upper mandrel portions 13 (FIG. 7) when reducing the height H of the mandrel tool 11 by the lifting jacks 17. In particular, the lifting jacks 17 are used to slowly lower the upper mandrel portions 13. Thereby, the fiber lay-up 10 arranged on the upper mandrel portions 13 is slowly lowered in form of a fold (not shown) into the gap 29 due to gravity. Further, the gravity force acting on the fiber lay-up 10 lowered in form of the fold (not shown) into the gap 29 will also tension it.

By the described folding and tensioning processes, it can be avoided that the fiber lay-up 10 is arranged and/or folded in an undesired way during the reduction of the size of the mandrel tool 11.

In step S5 of the method, the fiber-lay up 10 is strapped to the mandrel tool 11 by using several straps (not shown) distributed along the longitudinal direction L of the mandrel tool 11. Before applying the straps (not shown), the fiber lay-up 10 may also be wrapped in a foil (not shown). By step S5, the fiber lay-up 10 can be secured to the mandrel tool 11 during the following arrangement of the mandrel tool 11 inside the adjacent blade sections 8,9.

In step S6 of the method, the mandrel tool 11 having the reduced cross-section size S (i.e., the reduced height H and width W) and comprising the fiber lay-up 10 is inserted partially into a first blade section such as the outboard blade section 8 (FIG. 2).

It is noted that in FIG. 9—which also shows the process of inserting the mandrel tool 11 into the blade section 8—the leading edge and trailing edge mandrel portions 15, 16 and the bars 21 are omitted for illustration purposes. Further, in FIG. 9 also the fiber lay-up 10 and web element 30 is omitted for illustration purposes.

The first blade section 8 has, in particular, been manufactured using fiber-reinforced resin. The first blade section 8 has, for example, been manufactured simultaneously to the step S1 of pre-packing the fiber lay-up 10 on the mandrel tool 11.

In this example, the first blade section 8 is an inboard section of the blade 3 comprising a root end 45 (FIG. 2).

However, the mandrel tool 11 could also be firstly inserted into an outboard section of the blade 3. Further, in the shown example, the blade 3 is manufactured from two lengthwise sections 8, 9. However, in another example, the blade 3 could also be manufactured from more than two lengthwise blade sections. In such a case, the described process may be applied for joining any of two adjacent blade sections of the blade.

In FIG. 2, the first blade section 8 is fixed in position by alignment jigs 46. The mandrel tool 11 is inserted into the first blade section 8 by a lifting tool 47. The lifting tool 47 in this example is a lifting truck. However, the lifting tool may also be, for example, a crane. The mandrel tool 11 is, in particular, inserted partially into the first blade section 8 such that a portion 48 of the mandrel tool 11 is protruding from the first blade section 8, as shown in FIG. 2.

In step S7 of the method, a second blade section 9 of the blade 3 is arranged adjacent to the first blade section 8. In particular, the second blade section 9 is arranged adjacent to the first blade section 8 such that it accommodates the portion 48 of the mandrel tool 11 protruding from the first blade section 8, as shown in FIG. 2. The second blade section 9 is arranged adjacent to the first blade section 8 by alignment jigs 49. The alignment jigs 49 are, for example, mounted such that the second blade section 9 can be moved, e.g., on rails 50.

The second blade section 9 has, in particular, been manufactured using fiber-reinforced resin. The second blade section 9 has, for example, been manufactured simultaneously to the step S1 of pre-packing the fiber lay-up 10 on the mandrel tool 11.

The second blade section 9 in this example is an outboard blade section. Further, in this example, the second blade section 9 comprises a blade tip 51. However, the second blade section 9 could also be an inboard blade section.

Arranging the second blade section 9 adjacent to the first blade section 8 includes, for example, aligning the second blade section 9 to the first blade section 8 using the guiding rods 31 (FIG. 9).

In step S8 of the method, the cross-section size S of the mandrel tool 11 (i.e., its height H and width W) is increased to its initial size. In particular, the lifting jacks 17 and the retracting rod 18 are extended such that the upper mandrel portions 13 and the trailing edge mandrel portion 16 are moved to their original positions.

Using the bars 21, the fiber lay-up 10 folded into the gaps 25, 26 is tensioned during increasing the size of the mandrel tool 11 and, thus, during unfolding the fiber lay-up 10 out of the gaps 25, 26. Further, due to gravity also the fiber lay-up 10 folded into the upper gap 29 is tensioned during increasing the size of the mandrel tool 11 and, thus, during unfolding the fiber lay-up 10 out of the gap 29.

At the end of step S8, the middle portion 42 of the web element 30 is re-arranged between its first end second portions 40, 41 (FIG. 11).

Inserting the mandrel tool 11 into the first blade section 8 (step S6), arranging the second blade section 9 adjacent to the first blade section 8 (step S7) and/or increasing the size S of the mandrel tool 11 (step S8) includes matching the fiber lay-ups 33, 34, 35, 36, 37 and the web element 30, 30' (FIG. 10) arranged on the mandrel tool 11 with corresponding layers of the first blade section 8 and second blade section 9.

Figure 13:
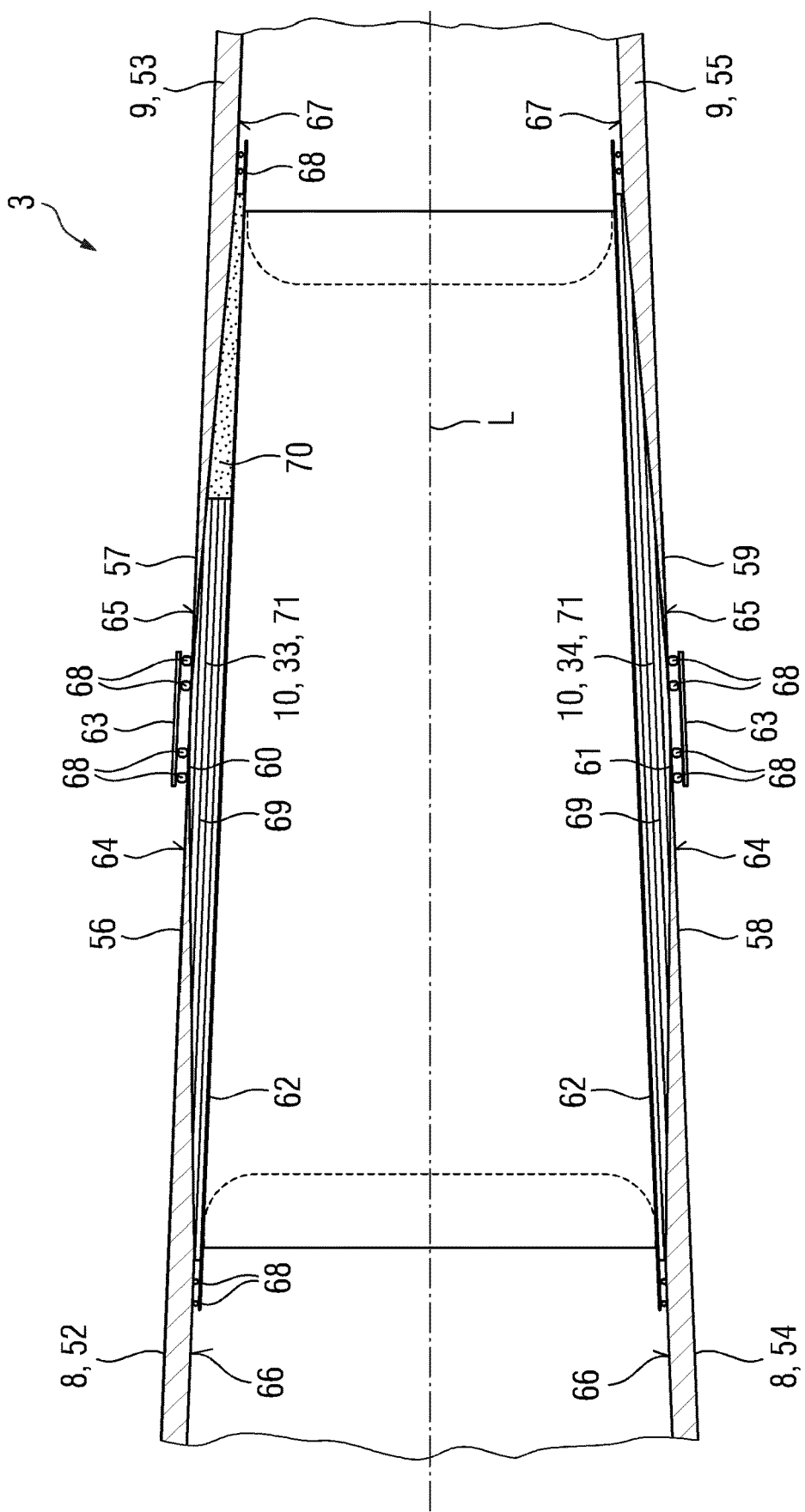
FIG. 13 shows a cross-section view of a part of the joined blade 3 taken along plane position B in FIG. 2.
Figure 14:
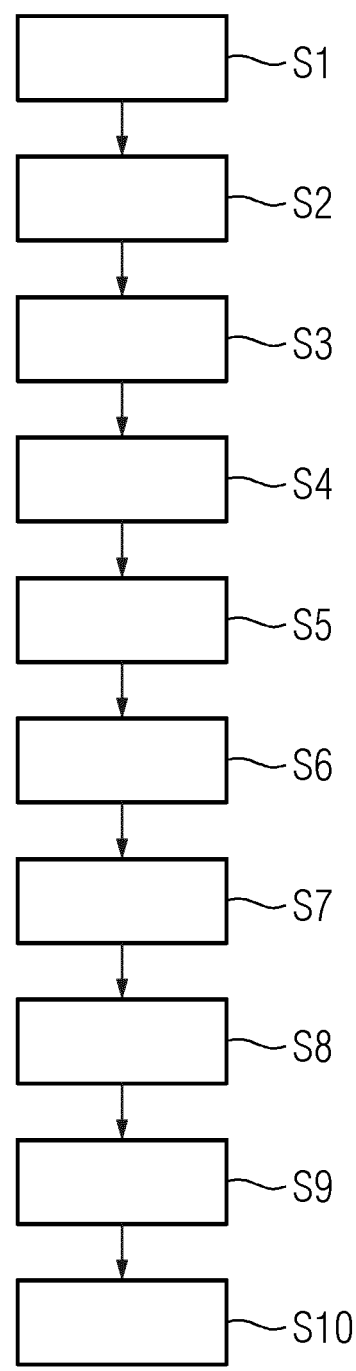
FIG. 14 shows a flowchart illustrating a method for manufacturing the wind turbine blade of the wind turbine of FIG. 1.

FIG. 13 shows a cross-section view of a part of the blade 3 taken along plane position B in FIG. 2. Shown in FIG. 13 are the first and second blade sections 8 and 9 arranged adjacent to each other as well as the fiber lay-up 10 arranged inside the first and second blade sections 8 and 9. The cross-section is taken through a pressure-side beam and a suction-side beam of the blade 3. In the upper part of FIG. 13 are shown the pressure-side beam 52 of the first blade section 8, the pressure-side beam joint 33 of the fiber lay-up 10, and the pressure-side beam 53 of the second blade section 9 in cross-section. In the lower part of FIG. 13 are shown the suction-side beam 54 of the first blade section 8, the suction-side beam joint 34 of the fiber lay-up 10, and the suction-side beam 55 of the second blade section 9.

Each of the pressure-side beams 52 and 53 and of the suction-side beams 54 and 55 comprises an outwardly tapered portion 56, 57, 58, 59. The outwardly tapered portions 56 and 57 of the pressure-side beams 52 and 53 of the first and second blade sections 8, 9 form a common recess 60. The fiber lay-up 33 for the pressure-side beam joint of the fiber lay-up 10 is arranged in the common recess 60. Likewise, the outwardly tapered portions 58 and 59 of the suction-side beams 54 and 55 of the first and second blade sections 8, 9 form a common recess 61. The fiber lay-up 34 for the suction-side beam joint of the fiber lay-up 10 is arranged in the common recess 61.

In step S9 of the method, the fiber lay-up 10 and the adjacent first and second blade sections 8, 9 are at least partially covered with a vacuum bag 62, 63. In this example, vacuum bags 62 have already been provided in step S1 during prepacking the mandrel tool 11. In step S9, a second vacuum bag 63 is provided at the outside surfaces 64, 65 of the first and second blade sections 8, 9. In step S9, the vacuum bags 62, 63 are sealed around the inner surfaces 66, 67 and the outer surfaces 64, 65 of the first and second blade sections 8, 9. FIG. 13 shows the sealing of the vacuum bags 62, 63 covering the fiber lay-up 33 for the pressure-side beam joint and the fiber lay-up 34 for the suction-side beam joint. The sealing is schematically and exemplarily indicated by sealing points 68 in FIG. 13. The sealing of the vacuum bags 62, 63 might be done by applying a sealing tape or any other suitable method. Although not shown in FIG. 13, the vacuum bags 62 and 63 are also sealed around the fiber lay-ups 35, 36, 37 for the leading and trailing edge beam joints and the shell joint and around the web element 30, 30'.

Then, a vacuum is generated within a cavity 69 defined by the sealed vacuum bags 62, 63. Further, a resin 70 is infused into the cavity 69. FIG. 13 shows the resin 70 starting to fill the cavity 69 and to embed the fiber lay-up 33 for the pressure-side beam joint. After completion of the infusion process, the infused resin 70 is fully embedding the complete fiber lay-up 10 arranged on the mandrel tool 11. The resin 70 is then cured to obtain a cured joining portion. In FIG. 13 the reference sign 71 indicates the cured joining portion which is formed when the fiber lay-up 10 (shown in FIG. 13 is 33 and 34 of 10) are fully embedded in the infused and cured resin 43.

The cured joining portion 71 joins the two blade sections 8, 9 from inside providing a light-weight and at the same time strong blade section joint.

In step S10 of the method, the mandrel tool 11, i.e., its leading-edge part 38 and its trailing edge part 39, are removed through the root end 45 of the blade 3 (FIG. 2).

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing a wind turbine blade, comprising:
   a) arranging a fiber lay-up on a mandrel tool, the mandrel tool comprising a frame and, as seen in cross-section, at least two mandrel portions connected to the frame, and wherein at least a portion of the fiber lay-up is supported by an outer surface of the at least two mandrel portions,
   b) reducing a cross-section size of the mandrel tool by retracting at least one of the at least two mandrel portions towards the frame,
   c) arranging the mandrel tool inside adjacent blade sections,
   d) increasing the cross-section size of the mandrel tool by extending at least one of the at least two mandrel portions away from the frame, and
   e) infusing at least a portion of the fiber lay-up with a resin and curing the resin to obtain a cured joining portion joining the blade sections inside.

2. The method according to claim 1, wherein the cross-section size of the mandrel tool is reduced by reducing a height of the mandrel tool and/or a width of the mandrel tool.

3. The method according to claim 1, including, during step b) or between step b) and step c) the step of folding the fiber lay-up inwards.

4. The method according to claim 3, wherein the mandrel tool comprises at least one gap extending along a longitudinal direction of the mandrel tool and arranged, as seen in cross-section, between two adjacent mandrel portions of the at least two mandrel portions, and wherein the fiber lay-up is folded inwards into the at least one gap.

5. The method according to claim 3, wherein the fiber lay-up is tensioned during and/or after folding it inwards.

6. The method according to claim 4, including, after step a) and before step b) the step of fixing at least one moveable longitudinal member to the mandrel tool such that it is arranged along the longitudinal direction of the mandrel tool and outside the at least one gap, and wherein the fiber lay-up is folded inwards by moving the at least one longitudinal member into the at least one gap.

7. The method according to claim 1, wherein:
   the at least two mandrel portions comprise at least two upper mandrel portions and at least two lower mandrel portions,
   the method includes, during step a), the step of arranging a web element between the at least two upper mandrel portions and between the at least two lower mandrel portions,
   the web element includes a first portion, a second portion and a middle portion arranged between the first and second portions,
   the method includes, before step b), the step of removing the middle portion, and
   the method includes, after step d), the step of re-arranging the middle portion between the first and second portions of the web element.

8. The method according to claim 1, including, after step b) and before step c), the step of strapping the fiber lay-up to the mandrel tool.

9. The method according to claim 1, wherein:
   the fiber lay-up comprises a fiber lay-up forming, once infused and cured, a shell joint joining a shell of a first one of the adjacent blade sections with a shell of a second one of the adjacent blade sections,
   the fiber lay-up comprises a fiber lay-up forming, once infused and cured, one or more beam joints joining one or more beams of a first one of the adjacent blade sections with one or more corresponding beams of a second one of the adjacent blade sections, and/or
   the fiber lay-up comprises a fiber lay-up forming, once infused and cured, a web joint joining a web of a first one of the adjacent blade sections with a web of a second one of the adjacent blade sections.

10. The method according to claim 1, wherein the mandrel tool is arranged partially inside a first one of the blade sections such that a portion of the mandrel tool protrudes from the first one of the blade sections, and a second one of the blade sections is arranged adjacent to the first one of the blade sections such that the second one of the blade sections receives the portion of the mandrel tool protruding from the first one of the blade sections.

* * * * *